United States Patent [19]
Siegel

[11] Patent Number: 6,099,062
[45] Date of Patent: Aug. 8, 2000

[54] SQUARE/ROUND BEVERAGE CONTAINER RECEPTACLE FOR AUTOMOTIVE VEHICLE CUP HOLDERS

[76] Inventor: Scott Siegel, 28 Longworth Ave., Dix Hills, N.Y. 11746

[21] Appl. No.: 09/138,052

[22] Filed: Aug. 20, 1998

[51] Int. Cl.⁷ .............................. B60N 3/12; A47K 1/08; A47K 5/00
[52] U.S. Cl. ...................... 296/37.12; 224/926; 248/314; 248/311.2
[58] Field of Search ................................ 296/37.12, 37.8, 296/37.13, 37.15; 224/281, 282, 926, 539; 248/311.2, 309.1, 314

[56] References Cited

U.S. PATENT DOCUMENTS

| | | | |
|---|---|---|---|
| 5,088,673 | 2/1992 | Chandler | 248/311.2 |
| 5,180,088 | 1/1993 | De Angeli | 248/311.2 |
| 5,326,064 | 7/1994 | Sapien | 248/311.2 |
| 5,676,340 | 10/1997 | Ruhnau | 248/311.2 |
| 5,897,041 | 4/1999 | Ney et al. | 224/483 |

*Primary Examiner*—D. Glenn Dayoan
*Assistant Examiner*—Lori L Coletta
*Attorney, Agent, or Firm*—Charles I. Brodsky

[57] ABSTRACT

A beverage container receptacle for a cup holder of given diameter provided as an automotive vehicle accessory including a substantially cylinder-shaped lower section having a diameter less than that of the automotive vehicle cup holder accessory, a substantially cubed-shaped upper section having a length greater than the diameter of the cup holder accessory, and a connecting surface joining an upper end of the lower section and a lower end of the upper section, with the connecting surface being of a construction and composition to support the weight of a beverage carton or bottle fitted through the upper section of the receptacle and towards its lower section.

12 Claims, 3 Drawing Sheets

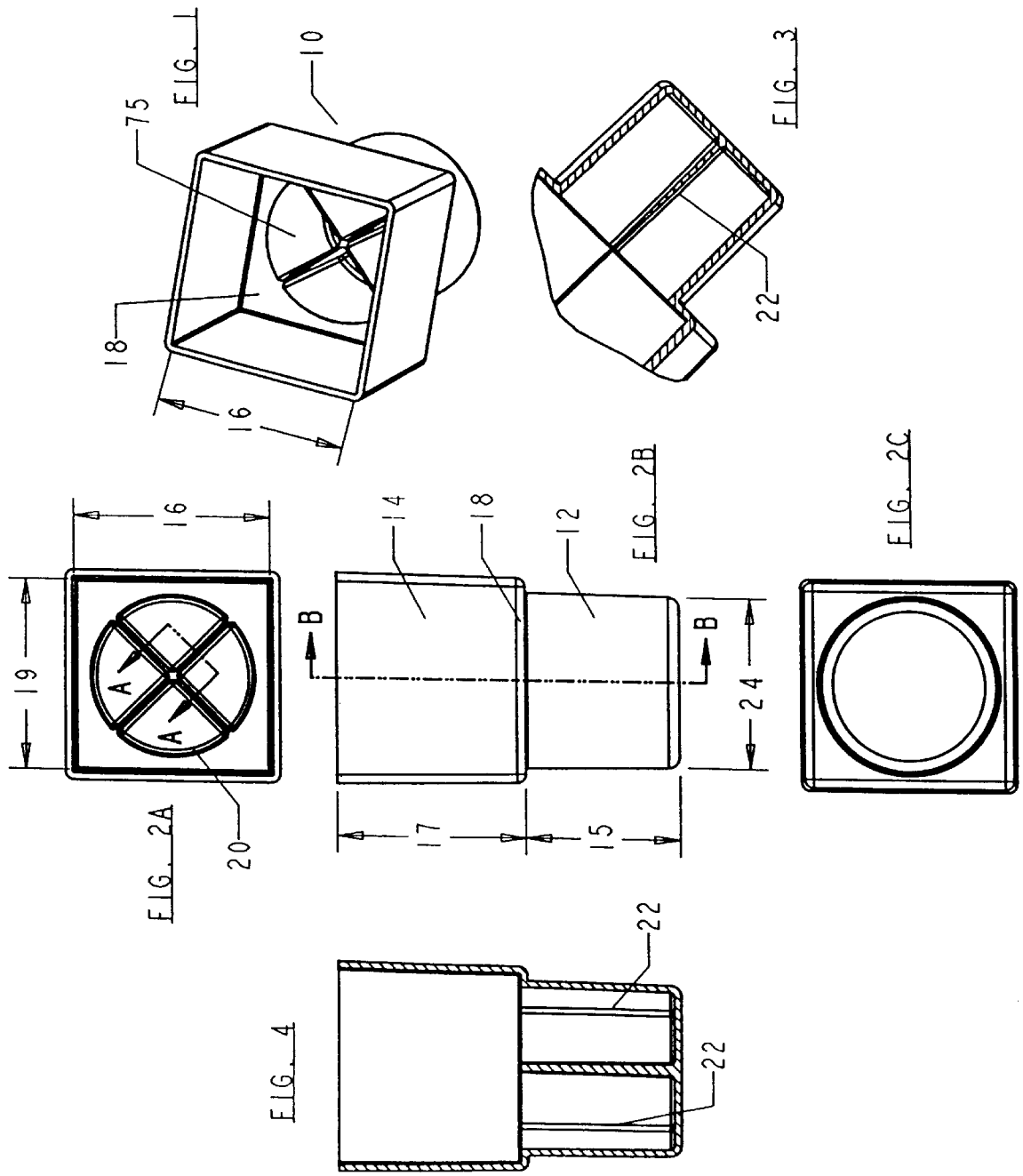

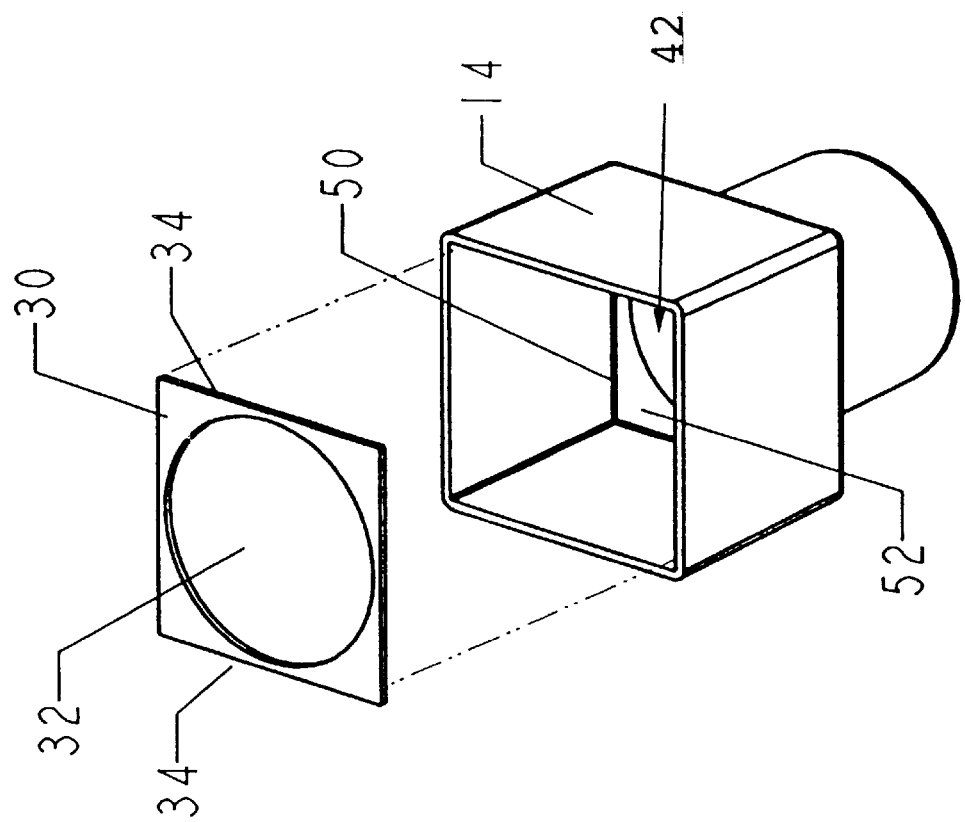
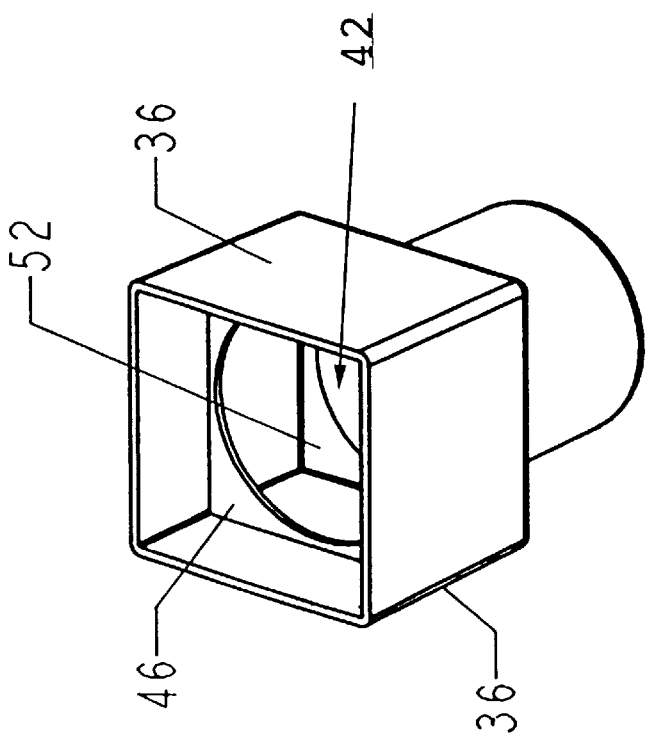

TOP VIEW

BOTTOM VIEW

SQUARE/ROUND BEVERAGE CONTAINER RECEPTACLE FOR AUTOMOTIVE VEHICLE CUP HOLDERS

FIELD OF THE INVENTION

This invention relates to automotive vehicle cup holder accessories, whether they be of the type that slides from a housing for subsequent use, or whether they be stationary and out-in-the-open as part of a passenger compartment design.

BACKGROUND OF THE INVENTION

As is known, cup holders of this type have more-and-more been provided as standard features of passenger automobile construction. As useful as they are, however, they are primarily sized, and as their name implies, for holding cups or 12 oz. cans. When employed in this regard, these accessories work perfectly well—but, experience has shown that they are generally inadequate for holding square shape containers (e.g., pint cartons of milk, juice, etc.) or the round-bottom larger bottles of juice or soft drinks, as sold under the Snapple and Arizona brand names, for example. In such latter instances, the cup holders are of insufficient diameter to receive the bottles or cans—much less hold them snugly in place; similarly, the cup holders (being provided with circular openings) are unable to accept the square shape of the various drink cartons presently available. In those situations, the end result will be seen to be one in which the beverage container is either held in the hand, or held between the legs on the seat. Obviously, it would be desirable to be able to have these square or larger rounded containers insertable into the cup holder, as well.

It would also be desirable, moreover, if these features could be made available to automotive vehicles which already possess cup holders in their design—instead of having to reconfigure and/or replace the cup holders present in the millions of vehicles already out there on the road which have them.

OBJECTS OF THE PRESENT INVENTION

It is an object of the present invention, therefore, to provide a receptacle for these cup holder accessories which will accept both square and round configured containers.

It is also an object of the invention to provide such a receptacle which can fit within the dimensions of those cup holders already present in vehicles now being driven.

It is another object of the invention to provide a receptacle of a construction and composition strong enough to support the weight of these additional containers.

It is a further object of the invention to provide a receptacle for these carton and large bottle containers which can be manufactured to sell at an acceptably affordable price.

It is yet another object of the invention to provide a receptacle of this type which can be manufactured of plastic and easily molded.

SUMMARY OF THE INVENTION

As will be seen, the container of the present invention includes a substantially cylinder-shaped lower section having a diameter less than that of the automotive vehicle cup holder, a substantially cubed-shaped upper section having a length greater than the diameter of the cup holder, and a connecting surface joining an upper end of the cylinder-shaped lower section with a lower end of the cube-shaped upper section. With the construction set forth, fabricated of plastic, an arrangement is described sufficient to support the weight of a beverage carton, bottle or can placed in the upper section of the receptacle.

As will also be seen, in a first, preferred embodiment, the connecting surface is of substantially square cross-section, except for a substantially circular section located inwardly from its edges. Such substantially circular section includes a plurality of ribs which extend downwardly to a lower end of the lower section to aid in supporting the weight of the container slipped into the receptacle. In a further modification, the substantially circular section is raised with respect to the remainder of the connecting surface, to fit within the underside recesses common in bottle and can manufactures in holding them in place.

In an alternate embodiment of the invention, the upper section of the receptacle tapers inwardly from its upper end towards its lower end, to receive and hold an insert of substantially square cross-section between its upper end and the connecting surface. As will be seen, with a circular opening in the insert of a diameter greater than the diameter of the lower section of the receptacle, a bottle or can can be received and secured. With the insert removed, a square-shaped carton can be received and held.

With both embodiments, it will be appreciated that the receptacle is thus available for use with either square or round bottom beverage containers—and can simply be inserted into the cup holder already present as part of the vehicle construction since the lower section of the receptacle is of a diameter less than that of the cup holder opening.

BRIEF DESCRIPTION OF THE DRAWINGS

These and other features of the present invention will be more clearly understood from a consideration of the following description, taken in connection with the accompanying drawings, in which:

FIG. 1 is a top perspective view of a preferred embodiment of a beverage container receptacle constructed in accordance with the teachings of the present invention;

FIGS. 2A, 2B and 2C are top, front and bottom views of the receptacle of FIG. 1;

FIGS. 3 and 4 are section views helpful in an understanding of the embodiment of FIG. 1;

FIGS. 5 and 6 are top perspective views helpful in an understanding of an alternate embodiment of the beverage container receptacle of the invention.

DETAILED DESCRIPTION OF THE INVENTION

Figure 7A:
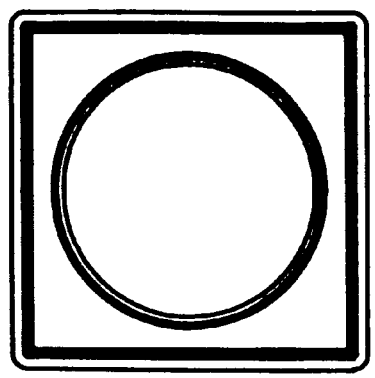
FIGS. 7A, 7B and 7C are top, front and bottom views of the receptacle of FIGS. 5 and 6.

Referring to FIGS. 1 and 2A–2C, the beverage container receptacle 10—preferably molded of plastic—includes a substantially cylinder-shaped lower section 12 of a diameter 24 less than the diameter of the automotive vehicle cup holder accessory in which it is to be placed. The receptacle 10 also includes a substantially cube-shaped upper section 14, having a length 16 greater than the diameter of the cup holder. A connecting surface 18 joins the upper end of the cylinder-shaped lower section 12 and the lower end of the cube-shaped upper section 14, and is of a construction and composition to support the weight of a beverage carton, glass bottle or aluminum can placed into the upper section 14, as indicated by the arrow 75.

With FIG. 3 understood as being a section view taken along the lines A—A of FIG. 2A, and with FIG. 4 understood as being a section view taken along the lines B—B in FIG. 2B, the connecting surface 18 will be seen to be of substantially square cross-section, except for a substantially circular section 20 located inwardly of its edges (FIG. 2A). In a preferred embodiment of the invention, this substantially circular section 20 includes a plurality of ribs 22 which extend downwardly to a lower end of the lower section 12 in acting as a support for the weight of a container placed in the receptacle 10, whether the container be a carton, a bottle, or a can. In the cases of the bottle and can, moreover, the substantially circular section 20 may be raised with respect to the remainder of the connecting surface 18, so as to fit within the underside recess oftentimes provided at the bottom of such bottle or can where only the edges actually rest on the surface. In such arrangement, the fitting of the raised circular section 20 within the recess serves to limit any sideways movement of the bottle or can. As is seen from both FIGS. 1 and 2A, the circular section 20 is formed of spaced, equal quadrant sections, to simplify manufacture by injection molding. By selecting the dimensions for the square-shaped upper section 14, the receptacle of the invention can be made to accommodate whatever carton, bottle or can might typically be inserted—and, of course, would accommodate smaller containers as well.

Figure 7B:
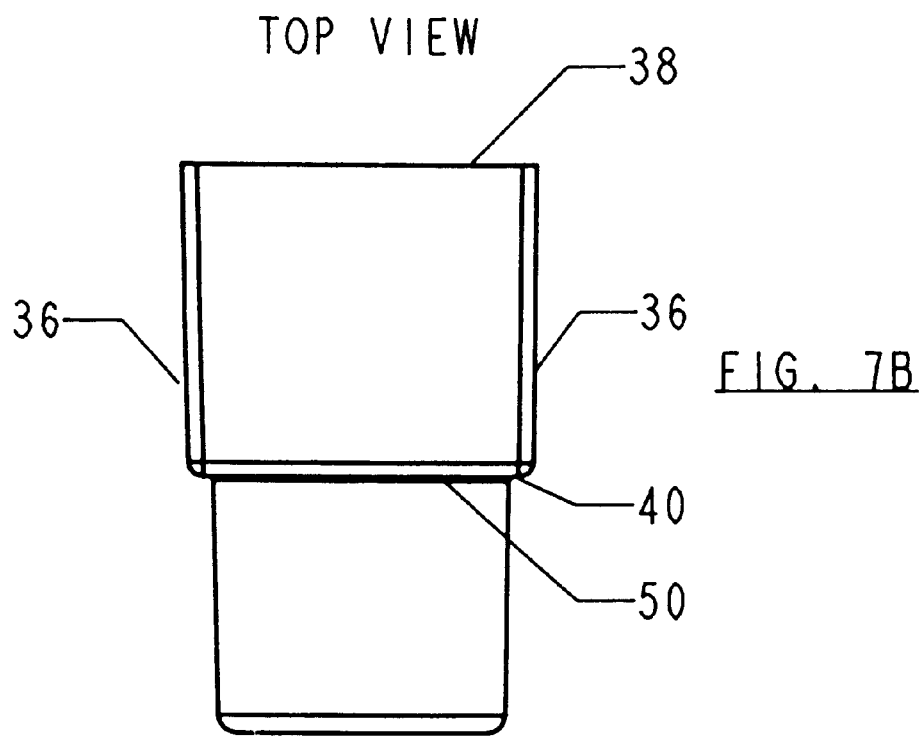
Figure 7C:
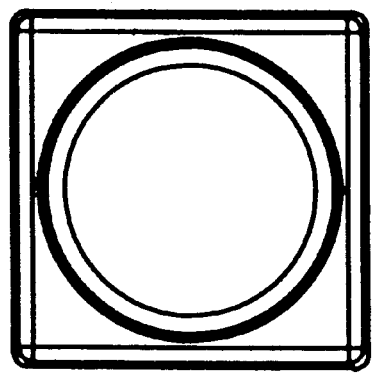

While Applicant does not wish to be limited to any particular set of values, the following have proven useful in dimensioning the upper section 14 to accommodate pint containers of milk or juices, larger size individual soft drink bottles such as bear the Snapple or Arizona brand name, and conventional 12 oz. sized aluminum cans:

Diameter 24 . . . 2-9/16 inches
Height 15 . . . 2-1/4 inches
Height 17 . . . 2-3/4 inches
Length 19 . . . 2-7/8 inches The arrangements of FIGS. 5, 6 and 7A–7C, on the other hand, show an alternate arrangement of the receptacle without the added ribs providing additional support for the container. As shown in FIGS. 5 and 6, a removable insert 30 is utilized, of substantially square cross-section having a circular opening 32 spaced inwardly from the side edges 34, for placement within the upper section 14. In this embodiment, the side walls 36 of the upper section 14 taper inwardly from its upper end 38 toward its lower end 40, so as to grab and hold the insert 30 between the upper end 38 and the connecting surface, shown as 50. As with the configuration of FIG. 1, the connecting surface 50 is of substantially square cross-section, except for a substantially circular section 42 located inwardly of its edges—but, with the circular section 42, shown open, being devoid of any rib sections or quadrants. With the insert 30 removed, as in FIG. 5, a container of square-shaped bottom—e.g. the milk or juice carton —is received, and supported by the remaining segments 52 of the connecting surface 50. With the insert 30 in position (FIG. 6), on the other hand, such carton would sit atop the segments 46, but the carton might then extend too high out of the receptacle, and thus be somewhat unstable, compared to the arrangement of FIG. 5. With the insert 30 in place, however, as shown in FIG. 6, smaller size bottles can pass through the circular opening 42, to rest upon the connecting surface 50, with the insert 30 then being able to hold the neck of the bottle in position. Where the bottle or can is of larger size, they, as with the square container, could extend too high out from the receptacle to make them less stable. With either embodiment of the invention, however, a far greater latitude will be seen for accepting either square or round shaped beverage containers in the cup holder, well beyond that which is possible with the present constructions of automotive vehicle accessories which substantially only support cups or 12 oz. cans in position.

While there have been described what are considered to be preferred embodiments of the present invention, it will be readily appreciated by those skilled in the art that modifications can be made without departing from the scope of the teachings herein. For example, analysis of particular manufacturer designs might indicate a need for tailoring the features and/or dimensions of the lower section 12 described above in order to accommodate easy and stable securement in the cup holders of the existing automotive vehicles, if and where necessary. Such refinements will be understood to fit and join with the descriptions set forth above, and in no way will be construed to detract from the improvements attendant with the invention. For at least such reason, therefore, resort should be had to the claims appended hereto for a true understanding of the scope of the invention.

I claim:

1. A beverage container receptacle for a cup holder of given diameter provided as an automotive vehicle accessory, comprising:

a substantially cylinder-shaped lower section having a diameter less than that of said automotive vehicle cup holder:

a substantially cube-shaped upper section having a length greater than the diameter of said automotive vehicle cup holder;

and a connecting surface joining an upper end of said cylinder-shaped lower section and a lower end of said cube-shaped upper section;

with said connecting surface being of a construction and composition to support the weight of a beverage carton or bottle fitting through said upper section of said receptacle toward said lower section; and wherein said connecting surface is of substantially square cross-section, except for a substantially circular section located inwardly from the edges thereof.

2. The receptacle of claim 1 wherein said substantially circular section of said connecting surface includes a plurality of ribs extending downwardly to a lower end of said lower section in supporting the weight of a carton or bottle fitted into said receptacle.

3. The receptacle of claim 2 wherein said substantially circular section of said connecting surface extends above said edges of said connecting surface.

4. The receptacle of claim 1 wherein (said upper section tapers inwardly from an upper end of said upper section towards said lower end of said upper section,) and wherein there is also included an insert of substantially square cross-section having a substantially circular opening spaced inwardly from edges thereof, and located within said upper section between its said upper end and said connecting surface.

5. The receptacle of claim 4 wherein said substantially circular opening is of a diameter greater than said diameter of said lower section, and of a dimension less than the length of said substantially square shaped insert.

6. The receptacle of claim 5 wherein said insert is removably insertable within said upper section of said receptacle.

7. The receptacle of claim 6 wherein said insert is removed for receiving a carton of substantially square shape bottom configuration in said receptacle.

8. The receptacle of claim 6 wherein said insert is emplaced in said upper section for receiving a bottle of substantially round bottom configuration in said receptacle.

9. The receptacle of claim 3 wherein said diameter of said lower section is of the order 2-9/16 inches.

10. The receptacle of claim 9 wherein said length of said upper section is of the order of 2-7/8 inches.

11. The receptacle of claim 10 wherein said lower section is of a height of the order of 2-1/4 inches.

12. The receptacle of claim 11 wherein the height of said upper section is of the order of 2-3/4 inches.

* * * * *